(12) United States Patent
Giessibl

(10) Patent No.: US 6,240,771 B1
(45) Date of Patent: Jun. 5, 2001

(54) DEVICE FOR NONCONTACT INTERMITTENT CONTACT SCANNING OF A SURFACE AND A PROCESS THEREFORE

(76) Inventor: Franz J. Giessibl, Seefelder Str 36, D-86163 Augsburg (DE)

( * ) Notice: Subject to any disclaimer, the term of this patent is extended or adjusted under 35 U.S.C. 154(b) by 0 days.

(21) Appl. No.: 09/257,177

(22) Filed: Feb. 25, 1999

(51) Int. Cl.$^7$ .............................. G01B 5/28; G01B 7/28; G01B 21/20
(52) U.S. Cl. ............................ 73/105; 250/306; 250/307
(58) Field of Search ............................ 73/606, 104, 105, 73/579, 635; 250/306, 307

(56) References Cited

U.S. PATENT DOCUMENTS

| | | | |
|---|---|---|---|
| 5,212,987 | * 5/1993 | Dransfeld et al. | 73/579 |
| 5,517,128 | * 5/1996 | Henninger | 324/765 |
| 5,631,410 | * 5/1997 | Kitamura | 73/105 |
| 5,641,896 | * 6/1997 | Karrai | 73/105 |
| 5,939,623 | * 8/1999 | Muramatsu et al. | 73/105 |
| 6,094,971 | * 8/2000 | Edwards et al. | 73/105 |

FOREIGN PATENT DOCUMENTS 9-264897 * 10/1997 (JP).

OTHER PUBLICATIONS

T. R. Albrecht Et Al., Frequency Modulation Detection Using High–Q Cantilvers for Enhanced Force Microscope Sensitity, J. Appl. Phys. 69(2), Jan. 15, 1991, pp. 668–673.

Ffranz J. Giessibl, Atomic Resolution of the Silicon (111)–(7x7) Surface by Atomic Force Microscopy, Science, vol. 267, Jan. 6, 1995, pp. 68–71.

Yasuhiro Sugawara Et Al., Defect Motion on an INP(110) Surface Observed with Noncontact Atomic Force Microscopy, Science, vol. 270, Dec. 8, 1995, pp. 1541–1728.

M. Tortonese Et Al., Atomic Resolution with an Atomic Force Microscope using Piezoresistive Detection, Appl. Phys. Lett. 62(8), Feb. 22, 1993, pp. 834–836.

K. Bartzke Et Al., The Needle Sensor–A Micromechanical Detector for Atomic Force Microscopy, International Journal of Optoelectronics, Vo 8, 1993, Nos. 5/6, pp. 669–676.

* cited by examiner

*Primary Examiner*—Hezron Williams
*Assistant Examiner*—Rose M. Miller
(74) *Attorney, Agent, or Firm*—Nixon Peabody LLP; David S. Safran

(57) ABSTRACT

A device for noncontact scanning of a surface (17), with a sensor (10) having an elongated spring element (11) and a sensing tip (15). The spring element is oriented essentially parallel to the surface to be scanned. The tip is located on a side (19) of the spring element which faces the surface to be scanned. The spring element has a quality of at least roughly 1000 in air for a vibration perpendicular to its longitudinal axis and perpendicular to the surface to be scanned. A process for noncontact scanning of a surface by means of a device with a sensor having an elongated spring element and a tip attached thereto, the sensor being set into resonant vibration. The spring element, by its vibration, produces a signal which, in a positive feedback loop, acts directly on the spring element in order to set the sensor into vibration.

15 Claims, 4 Drawing Sheets

DEVICE FOR NONCONTACT INTERMITTENT CONTACT SCANNING OF A SURFACE AND A PROCESS THEREFORE

BACKGROUND OF THE INVENTION

1. Field of the Invention

The invention relates to a device for noncontact intermittent contact scanning of a surface with an adjustment unit and a sensor with a tuning fork which has two spring tongues connected by a base part and which is arranged such that the two spring tongues are oriented essentially parallel to the surface to be scanned, and with a tip attached underneath to the front end of the lower spring tongue, and with the upper tongue attached to a mount the tuning fork mount assembly having a quality of at least roughly 1000 in air for a vibration perpendicular to its longitudinal axis and perpendicular to the surface to be scanned. The invention also relates to a process for noncontact scanning of a surface by means of a device with a sensor with an extended spring element and a tip attached thereto, the sensor being set into a resonant vibration, at least one vibration parameter being acquired as the vibration signal and the change of the signal which results from the action of the force between the tip and the surface to be scanned being used to control the distance between the surface to be scanned and the tip. Possible applications include scanning force microscopy and profilometry.

2. Description of Related Art

Scanning force microscopy is based on scanning a fine tip over a surface (in the x and y direction), by controlling the distance to keep constant the force acting between the tip and surface and to acquire an image from the vertical movement (movement in the z-direction) of the tip. Imaging is determined by the interaction of this tip with the surface. Basically, it is distinguished between an imaging mode with repulsive and attractive interaction between the tip and the specimen. When a tip approaches a surface, the force between the tip and specimen is first attractive. As soon as the tip and specimen "touch," the force is repulsive. This force is measured by the fine tip being mounted on a spring element or a leaf spring and the bending of this leaf spring being measured.

When the tip is scanned in the repulsive mode (this mode is used primarily in profilometers) the tip is worn away with time, in the attractive mode it remains sharp for a long time. According to T. R. Albrecht (T. R. Albrecht et al, J. Appl. Phys. 69, 668 (1991)) the attractive mode has advantages over the repulsive mode, because chemical bonding between the tip and the specimen is prevented and the tips are not worn off. In doing so, the leaf spring is excited to natural vibration by a piezoelement. The frequency is given by:

$$f_0 = 1/(2\Pi)(k_0/m)^{0.5} \quad \text{(Eq. 1)}$$

where $k_0$ is a spring constant and m is the effective mass. The interaction between the tip and surface yields a new effective spring constant $$k_{\it{eff}} = k_0 + k'. \quad \text{(Eq. 2)}$$

The tip-surface interaction results in a negative k'; thus, the new vibrational frequency becomes less than the eigenfrequency of the leaf spring. The frequency shift thus offers a measure for the average distance between the tip and surface and can be used to acquire an image (so-called FM mode). The vibrating tip is scanned over the specimen and the height z is adjusted such that the frequency shift remains constant.

If first we examine the attractive interaction between a spherical tip with radius R and a plane surface at distance z, according to J. Israelachvili ("Intermolecular and Surface Forces", Academic, London 1985) a force F(z) is given by:

$$F(z) = AR/(6z^2) \quad \text{(Eq. 3)}$$

where A is the co-called Hamaker constant, a material constant which is dependent on the material of the tip or surface. For solids it is roughly $10^{-19}$ J. The interaction constant k' is then the derivation of the force according to the distance, explicitly:

$$k' = -AR/(3z^3) \quad \text{(Eq. 4)}$$

The relationship between the frequency shift and distance is then given for k' << k by:

$$\Delta f/f_0 = 0.5 k'/k_0 = -AR/(6k_0 z^3) \quad \text{(Eq. 5)}$$

The frequency shift increases steeply as the distance decreases. When the tip is too far from the surface, the error signal is very small; it lasts until the control deviation is corrected On the other hand, if the tip is too near the surface, the error signal is very large, and the control circuit can oscillate.

For thermodynamic reasons, the measurable force gradient is not optionally small. Albrecht et al. (T. R. Albrecht, P. Gruetter, D. Home, and D. Rugar), J. Appl. Phys. 69, 668, 1991) have computed the measurable force gradient:

$$k'_{min} = ((4k_0 k_B T B)/(\pi f_0 A_0 Q))^{0.5} \quad \text{(Eq. 6).}$$

($k_0$ is the spring constant of the detector in N/m, $k_B$ is the Boltzmann constant in J/K, T is the temperature in Kelvin, B is the bandwidth of the frequency analyzer in Hz, $f_0$ is the eigenfrequency in Hz, $A_0$ is the vibration amplitude in m, Q is the quality). These thermodynamic factors yield a complication for measurement of the force gradient: the vibration amplitude cannot be made optionally small. The average tip-surface distance cannot become smaller than the vibration amplitude. Therefore, in practice, for the optimum vibration amplitude, a middle way must be found between the noise of frequency measurement at too small an amplitude and too large an average distance at too large an amplitude.

For minimally attainable resolution, besides Equation 6 there are two other criteria which relate to the relationship between the spring constant of the force sensor and attainable resolution. According to Equation 4, the tip-surface interaction results in a negative k' so that the vibration frequency due to the interaction becomes smaller than the eigenfrequency of the spring element. It is important for operation that k' must be smaller than $k_0$, otherwise the tip snaps onto the surface and can no longer vibrate freely. The lateral resolution of the microscope is of the magnitude of the working distance d, i.e. at a given resolution λ, a barrier arises for the force constant (stability condition):

$$k_0 > 12AR\lambda^{-3} \quad \text{(Eq. 7)}$$

In particular, at a tip radius of 100 nm and a resolution of 1 nm, i.e. roughly two atomic diameters, it is found that the force constant of the spring element must be greater than 120 N/min. This value is computed from Equation 4. The second criterion relates to an upper barrier for the force constant. The interaction between the tip and surface deforms the latter. Assuming that the force application to the surface via a hemisphere with radius λ/2, in the volume under the surface, causes a strain s, the spring constant of the surface can be defined as:

$$k_{surface} = 2\lambda E \qquad \text{(Eq. 8)}$$

where $\lambda$ is the resolution and E is the elasticity constant (for steel, for example, it holds that the value of E equals $2 \times 10^{11}$ N/m²). When the spring constant of the surface is greater than $k_0$, the surface bulges more strongly than the spring bends. For a desired resolution of 10 nanometers, $k_0$ should not be greater than 4000 N/m.

A generic device for noncontact scanning of a surface and a generic process for noncontact scanning of a surface of the type to which this invention is directed are known, for example, from F. J. Giessibl, Science 267, 68 (1995), Y. Sugawara et al, Science 270, 1646 (1995) and M. Tortonese et al, Appl. Phys. Lett. 62, 834 (1993).

The attractive mode was operated so sensitively that, with it, for the first time atomic resolution could be detected on a semiconductor (F. J. Giessibl, Science 267, 68 (1995), Y. Sugawara et al, Science 270, 1646 (1995). This mode is much more complex to operate than the repulsive mode. The interaction constant k' is strongly dependent on the working distance. The frequency shift was used directly as the control variable. Thus, the loop gain of the frequency shift-distance control circuit depends, likewise, sensitively on the working distance. In the FM mode, this leads quickly to instabilities, and thus, to unreliable operation.

The bending of the lead spring was to date measured by a light beam which is directed at the spring and reflected or by an applied resistance which changes its value by bending (piezoresistive effect) orby a voltage produced by bending (piezoelectric effect). To do this, force springs microfabricated from silicon are used with spring constants around 10 newton/m and tip radii of curvature of a few nanometers (M. Tortonese et al. Appl. Phys. Lett. 62, 834 (1993). The springs are excited to vibrate by piezoplates.

Here, the disadvantage is that these known arrangements require an almost atomically sharp tip in order to achieve atomic resolution. Slight contact of the tip with the surface to be scanned can increase the tip radius such that stable operation is no longer possible. In addition, for good operation the mechanical contact between the force sensor and piezoplates must be very solid. But, this is often a problem, so that reliability suffers and noise is increased. In addition, the mechanical connection causes a phase shift which is hard to predict. Therefore, in the control electronics, the phase shift must be adjustable; this means additional cost. Another disadvantage is that these sensors can only be used in a vacuum because the mechanical quality of these sensors in air is too small to achieve high resolution (Eq. 6).

Dransfeld et al. (U.S. Pat. No. 5,212,987) describe a force sensor based on tuning forks where the sensor is mounted at the base of the fork. The mass of the tip on one tongue is compensated by putting a counterweight on the other tongue. The disadvantage of this technique is that it is difficult and expensive to tune the counterweight. Also, the arrangement is detuned when the tip interacts with the sample, causing a severe loss in quality factor upon interaction with the sample (see Eq. 6)

K. Bartzke et al., International Journal of Optoelectronics 8, Nos. 5/6, 669–676, 1993, discloses a sensor in which the spring element of the sensor consists of a quartz rod 2 mm long which is produced lithographically from a quartz plate and which has a spring constant in the longitudinal direction of the rod of roughly 100,000 N/m. On the face surface of the rod, by means of electronic beam induced deposition in a scanning electron microscope, a tip 3 microns long with a diameter of 300 nm is applied. The sensor is attached to the piezoelectric adjustment unit, the quartz rod being oriented perpendicularly to the surface to be scanned. The quartz rod forms an oscillator which is piezoelectrically excited by an external voltage signal and which, in the longitudinal direction of the rod, vibrates with an amplitude of a few nanometers at a resonant frequency of 1 MHz. The sensor is operated in a mixed mode which is between a purely attractive and purely repulsive mode. The change of vibration phase which results from the interaction of the tip and surface relative to the excitation signal is used for controlling the distance of the tip.

The disadvantage in this arrangement is that outside excitation requires additional components and implies the use of a vertical quartz rod, that the stiffness of the spring in the x-y plane is much less than in the z-direction, i.e. in a lateral force component, the sensor is deflected parallel to the plane. Another disadvantage is the extremely high spring constant (see Eq. 8).

SUMMARY OF THE INVENTION

In view of the foregoing, a primary object of this invention is to devise a force microscopy sensor which avoids the aforementioned defects of the prior art and which is still simple and economical to produce, which allows high resolution in the atomic range and which is reliable in operation.

Another object of the invention is to devise a process for scanning of one surface with a sensor which avoids the aforementioned defects.

These objects are achieved in accordance with the invention by a device and process for noncontact scanning of a surface as described in greater detail below.

In one preferred embodiment of the device in accordance with the invention, it is provided that the spring element is made in the form of a tuning fork with two spring tongues which are joined by a base part and which is preferably made of a piezoelectric material, particularly quartz. This special geometry and this special material yield a spring element of high quality. The tongue which does not carry the tip is attached to a mount, and the mass of the mount is at least five times the mass of one tongue.

Furthermore, it is preferably provided that the tuning fork is arranged with respect to the surface to be scanned such that the two spring tongues are parallel to the surface on above the other, the tip being attached underneath the front end of the lower spring tongue and the tuning fork being attached by the top of the upper spring tongue to an mounting unit. This arrangement of the tuning fork on the adjustment unit ensures corresponding vibration of the spring element with high quality.

In one preferred embodiment of the process according to the invention, it is provided that the acquired vibration parameter is the vibration frequency. Furthermore, preferably, a control circuit is provided for distance control which is made similarly, the derived signal being formed from the logarithm of the change of the vibration signal, and preferably, a logarithmic amplifier is used to amplify the change of the vibration signal. This represents a simple solution for linearization of the control circuit.

In one preferred embodiment of the process in accordance with the invention, it is provided that the sensor behaves piezoelectrically. This allows a simple execution of the feedback loop.

Furthermore, it is preferably provided that the vibration signal is used, at the same time, to control the distance of the tip from the surface to be scanned. This provides a device that is as simple as possible for executing the process of the invention.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
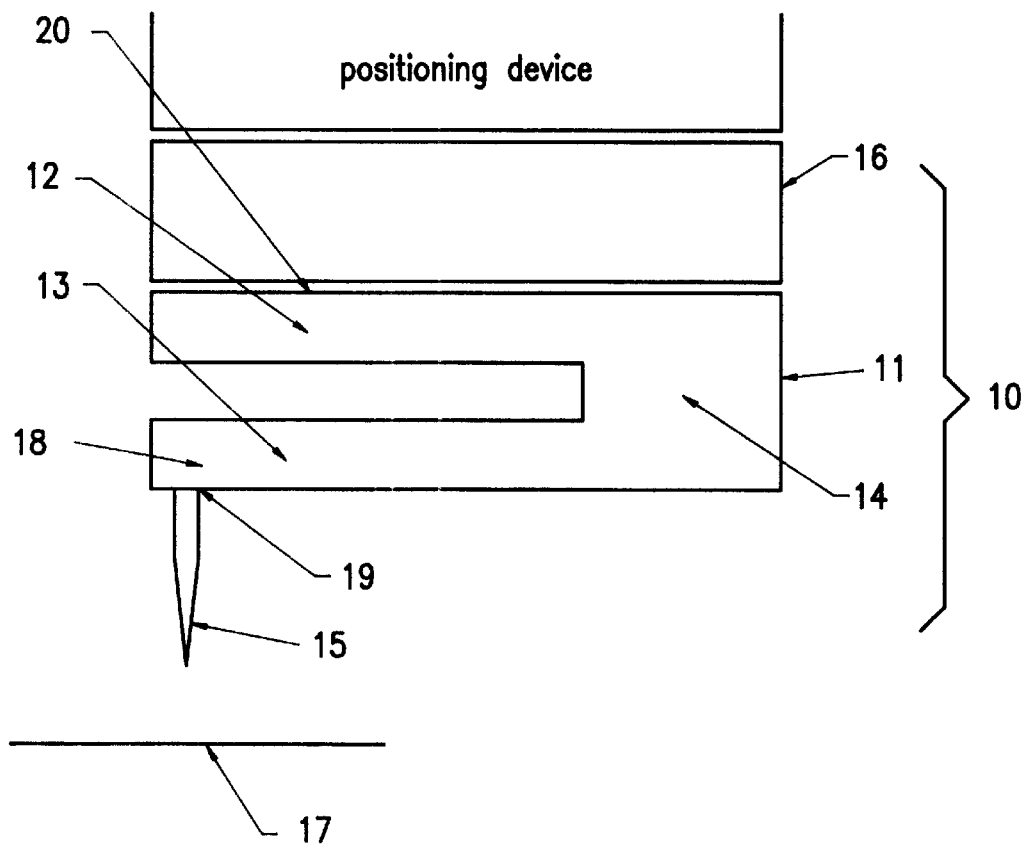
FIG. 1 schematically shows a sensor in accordance with the invention for scanning of a surface.
Figure 1A:
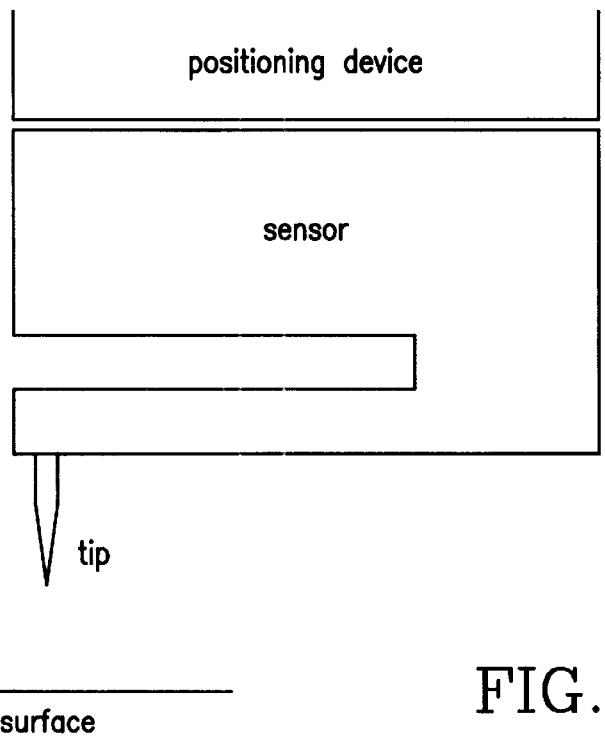
FIG. 1a schematically shows an embodiment where tuning fork and mount are produced out of a single piece of material.
Figure 1B:
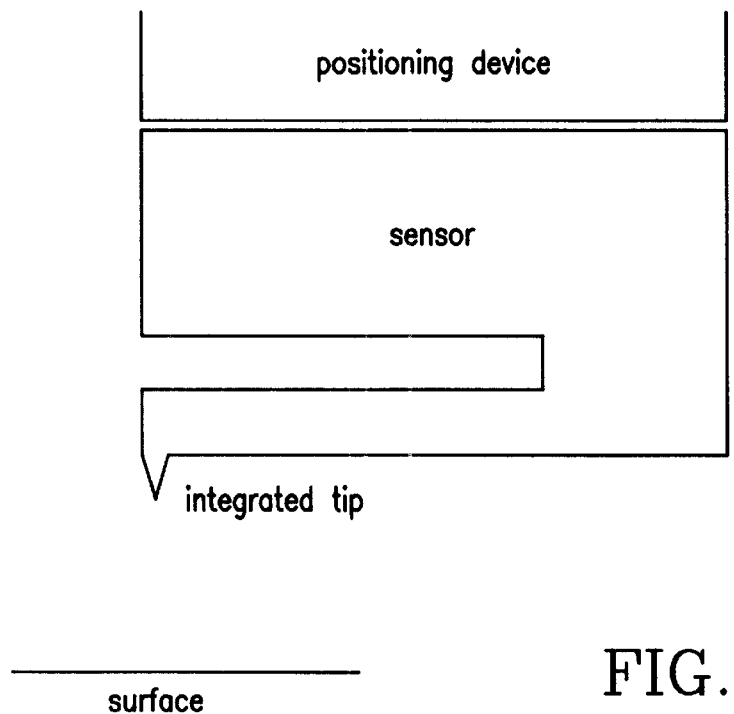
FIG. 1b shows an embodiment, where mount, fork and tip are produced out of a single piece of material.

As shown in FIG. 1, a sensor 10 for a force microscope for noncontact intermittent content scanning of surfaces is comprised of a spring element 11 which is made in the form of a tuning fork with two spring tongues 12, 13 connected by a base part 14, and a sensing tip 15. The sensing tip 15 is preferably electrically conductive.

The spring element 11 is attached to an positioning unit 16 at the top surface 20 of the upper spring tongue 12. The positioning unit 16 is made in a conventional manner of three piezoelements (not shown) for vertical adjustment and/or for lateral adjustment of the spring element. The spring element is oriented such that the spring tongues 12, 13 are oriented parallel to a surface 17 to be scanned, the spring tongues 12, 13 lying vertically one above the other. The tip 15 is attached to the front end 18 on the lower side 19 of the lower spring tongue 13, i.e. the side 19 facing the surface 17 to be scanned.

The spring element 11 is made preferably as a quartz tuning fork. For example, a commercial watch crystal (for example, available from Buerklin Elektronik Munich, or Conrad Electronic Hirschau) with a resonant frequency $f_0$ of 32,768 Hz can be used. The tip 15 is preferably an etched tungsten tip with a radius of 50 nm. These tips are used in scanning tunneling microscopy. The electrical potential of the tip is separate from the electrical potential of the spring tongues 12, 13, i.e. the spring element. The tip is cemented to the tongue 13 preferably with the binary adhesive, having an epoxy resin and a hardener catalyst, such as TORR SEALS® from Varian Associates, Palo Alto, Calif. The electrical connection of the tip can be achieved by applying a terminal with conductive silver. Alternatively, the tip can also remain insulated or can be connected by conductive silver to one of the two tongues 12, 13. Also, the tip can be produced by electron microscopic deposition, as is known from example from K. Bartzke et al., International Journal of Optoelectronics 8, Nos. 5/6, 669–676, 1993.

For a U-shaped tuning fork geometry it is stated in mechanics textbooks that the spring constant k is given by:

$$k = Ewt^3/(4L^3) \tag{Eq. 9}$$

where E is the modulus of elasticity, e.g., 7.87 $10^{10}$ N/m², w is the width of tuning fork, e.g., 0.4 mm, t is the thickness, e.g., 0.6 mm, and L is the length e.g., 4 mm, of the spring tongues, and fox is defined by the relationship:

$$f_0 = (1/2\pi) 1.015 t/L^2 (E/p)^{0.5} \tag{Eq. 10}$$

with parameters as above and ρ being the density, e.g., 2650 kg/m³. The spring constant of commercial 32768 Hz quartz tuning forks is thus roughly 26200 N/m. This spring constant or this resonant frequency applies to a vibration of the spring tongues transversely to their longitudinal direction in the plane in which the two spring tongues lie.

At a spring constant of 26200 N/m, the sensor according to Equation 8 acheives a resolution of 60 nm. The high stiffness allows much more stable operation than with spring elements with a spring constant of around 10 N/m as is typically used in the FM noncontact method. In addition, between the tip and surface, very much greater forces can act, as is necessary for future applications, such as sputtering, etc. The geometrical parameters can also be changed to achieve smaller spring constants and thus higher resolution. Tuning forks with a spring constant of roughly 4000 N/m are available from Buerklin Elektronik Munich. In this way, a resolution of roughly 10 nm is achieved.

The aforementioned strong dependency of the interaction constant k' on the distance between the tip and the surface can be compensated, at least in part, by linearization of the control circuit. The control circuit for controlling the distance depending on the frequency shift can be made digital or analog. In a digital control circuit, as is shown schematically in the uppermost switch position in FIG. 2, the dependency of the frequency shift of the vibration of a sensor 10 on the distance between the tip 15 and surface 17 to be scanned is determined by measurement. Here, for determining the vibration frequency, a voltage signal is tapped which is generated by the piezoelectric property of the quartz material of the spring element 11, i.e. the tuning fork, by the vibration of the spring element 11 at the output of the oscillator OSC, and which is amplified by an amplifier V1. The amplified voltage signal is supplied to a FM demodulator, for example. a phase-locked loop component PLL of type 560 from Signetics. The PLL component is wired in the conventional manner (see the data sheet of the PLL component) such that its rest frequency corresponds to the eigenfrequency of the vibrating crystal (in the embodiment according to FIGS. 1–3, f=32,768) and the capture bandwidth is roughly 100 Hz. The PLL component delivers an output signal $U_{PLL}$ which is proportional to the frequency shift Δf in accordance with the relationship:

$$U_{PLL} = 1V\Delta f/100Hz \tag{Eq. 11}$$

The following table for a distance range from 0.2 nm to 1.2 nm shows the attractive force between the tip and specimen, derivative $\partial F/\partial z$, the frequency shift $\Delta f$ computed therefrom, and the derivative of $\Delta f$ and $\log(-\Delta f/fO)$ in terms of z. Here, the material parameters which apply in this embodiment were used:

| z in nm | 0.2 | 0.3 | 0.4 | 0.5 | 0.6 | 0.7 | 0.8 | 0.9 | 1.0 | 1.2 |
|---|---|---|---|---|---|---|---|---|---|---|
| F(z) in nN | 2038 | 9.3 | 5.2 | 3.3 | 2.3 | 1.7 | 1.3 | 1.0 | 0.8 | 0.6 |
| $\partial F/\partial z$ in N/m | −208.3 | −61.7 | −26.0 | −13.3 | −7.7 | −4.9 | −3.3 | −2.3 | −1.7 | −1.0 |
| $\Delta f$ in Hz | −130.5 | −38.6 | −16.3 | −8.3 | −4.8 | −3.0 | −2.0 | −1.4 | −1.0 | −0.6 |
| $\partial f/\partial z$ in Hz/nm |  | 919 | 223 | 80 | 35 | 18 | 10 | 6 | 4 | 2 |
| $\log(-\Delta f/fo)$ | −2.40 | −2.93 | −3.30 | −3.59 | −3.83 | −4.03 | −4.21 | −4.50 | −4.50 | −4.7 |
| $\frac{\partial \log(-\Delta f/fo)}{\partial z}$ |  | −5.29 | −3.75 | −2.91 | −2.38 | −2.01 | −1.74 | −1.53 | −1.37 | −1.19 |

The derivative of the control signal in terms of z is incorporated into the loop gain of the control circuit. But also, the initially mentioned problem of the FM mode is apparent: the frequency shift $\Delta$ depends largely nonlinearly on the distance; at a distance of 0.3 mm, the frequency changes by 35.8 Hz/nm, for z=1.2 nm, only by more than 0.1 Hz/nm. Thus, the FM method, at a distance of 0.2 nm, is 300 times as sensitive as at a distance of 1.2 nm.

Figure 2:
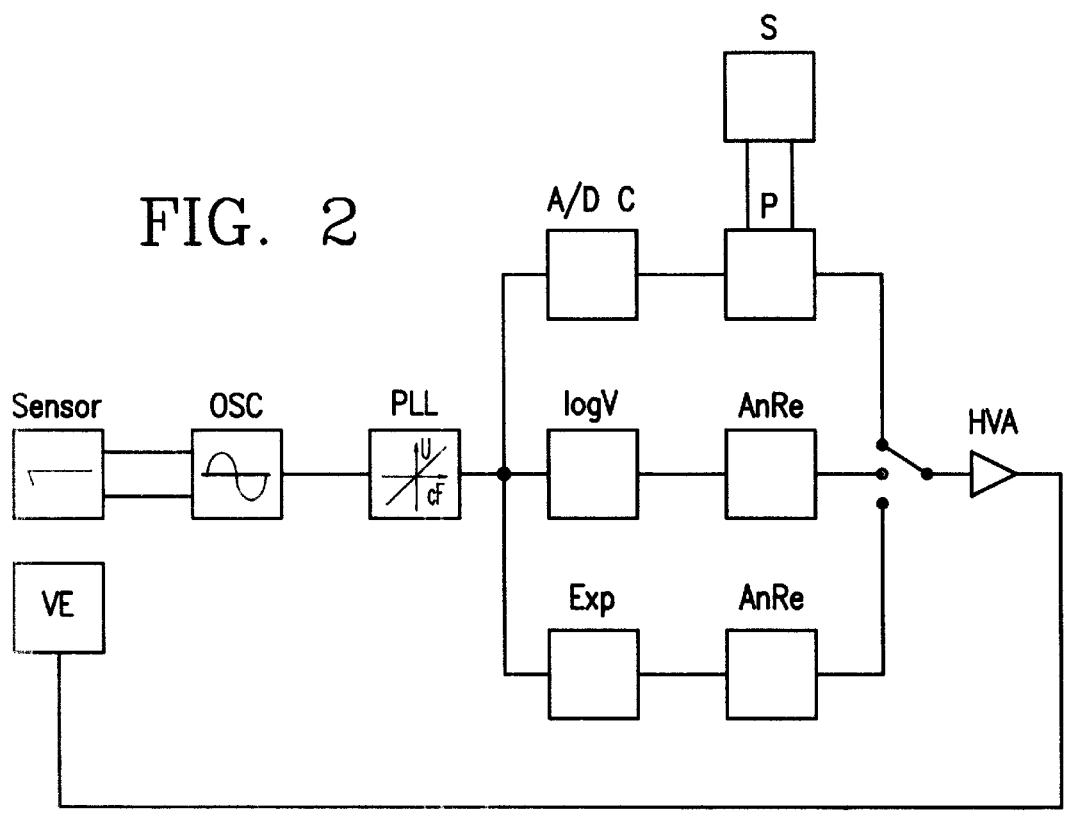
FIG. 2 schematically shows a control circuit as for operation of the sensor from FIG. 1 in three alternative embodiments of the invention.

For good operation of the imaging process, the error signal must be linearized. For this purpose, there are three possibilities which are shown in FIG. 2:

1) Digital control (DiRe): The distance between the tip and surface is traversed in a fixed region, while the vibration frequencies which arise at certain distance values are determined by a processor P from the voltage signal $U_{PLL}$ digitized by an A/D converter and are stored in a storage element S. Interpolation between the individual measurement values is done so that the functional relationship between the vibration frequency of the sensor and the distance between the tip and surface is roughly determined. Then, the processor P computes the inverse function therefrom. Finally, the inverse function determined in this way is ultimately used for computing the control deviation by means of the processor P. Instead of the direct frequency deviation of the sensor vibration from the set point, a value computed from the determined inverse function is used and converted into an analog signal via a D/A converter. This signal is amplified by a HVA amplifier and sent to the input for vertical adjustment of the positioning unit 16.

2) Analog solution with logarithm amplifier (logV): The derivation of the logarithm of the frequency shift at 0.3 nm is only five times as great as at 1.2 nm. Thus, when using the logarithmized frequency shift, the control circuit is much more stable. In doing so, the output signal $U_{PLL}$ of the PLL component is supplied to a logarithnic amplifier (for example, an AD759N), and thus, delivers the desired output signal:

$$U_{LAV} = \log(-\Delta f/f_o) \quad \text{(Eq. 11)}$$

3) Analog solution (Exp): An exponenter is used as is sold, for example, by the company Analog Devices (product no. AD538). According to Equation 5, the frequency shift is proportional to the inverse of the cube of the distance. Thus, the distance is proportional to the inverse of the cube root of the frequency shift. The component AD538 can be wired such that the output is equal to the inverse of the cube of the input.

Figure 3:
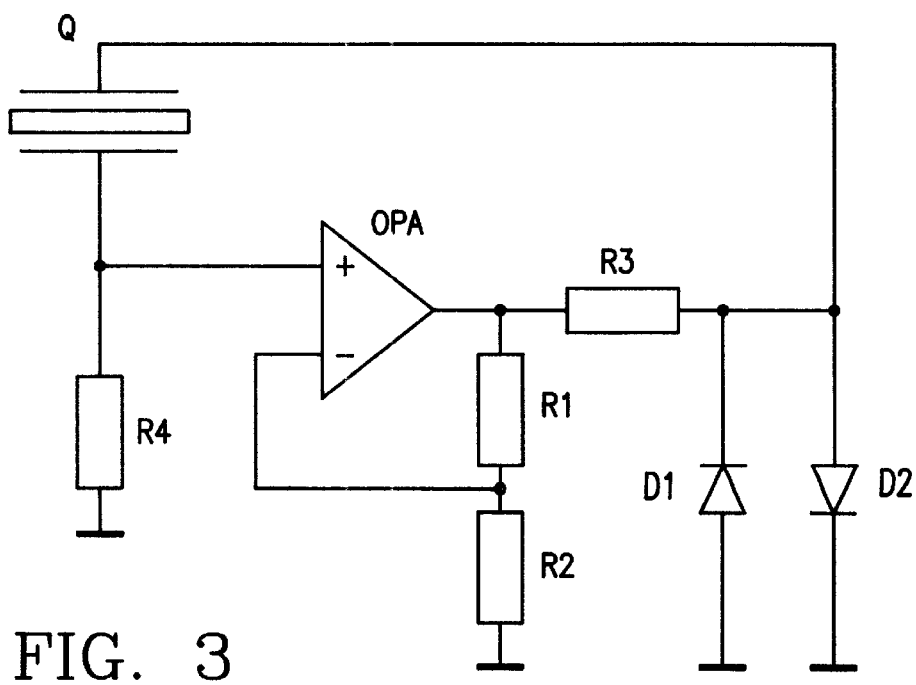
FIG. 3 show circuit for vibration excitation of a sensor in accordance with a first embodiment of the invention.
Figure 4:
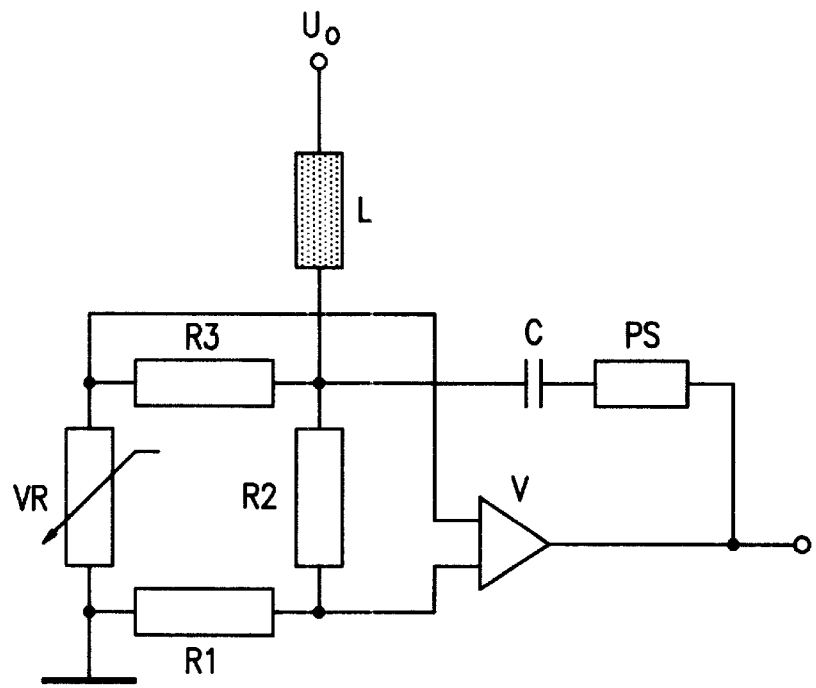
FIG. 4 shows a circuit for vibration excitation of a sensor as claimed in accordance with a second embodiment of the invention.
Figure 5:
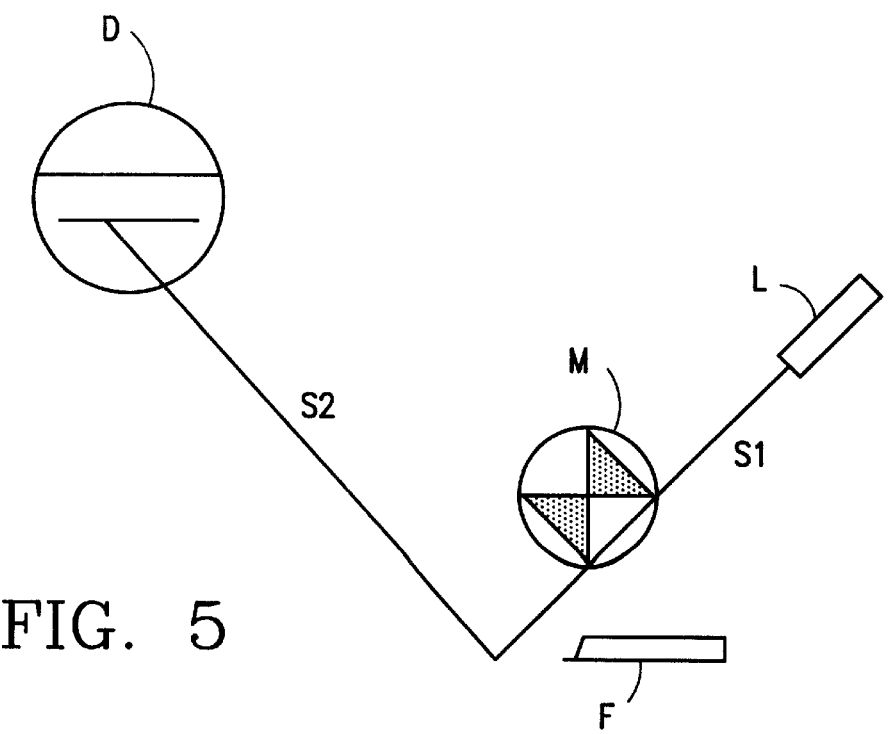
FIG. 5 schematically depicts an arrangement for vibration excitation of a sensor in accordance with a third embodiment of the invention.

FIGS. 3–5 show schematic circuits for these three embodiments; in the analog solutions, the control is executed analogously, preferably with an integral controller AnRe.

The sensor is operated in a self-excited mode. For vibration excitation of the sensor there are thus several possibilities, the fact being used that, regardless of the detection mode (for example, light pointer, piezoresistive, piezoelectric) of the vibration frequency, the spring element can also be influenced by the reversal of detection. In the light pointer mode, the spring element can be excited by modulation of the light with the cigenfrequency of the spring element (transfer of the momentum of the photons during reflection). The autovibration process is especially simple in electrical detection (piezoresistive, piezoelectric). Then, only the bridge voltage or the voltage which lies on the tuning fork need be used as the oscillator circuit.

In the piezoelectric version, the spring element is wired as a component of a crystal oscillator, as is shown schematically in FIG. 2. The vibration circuit is comprised of the voltage tap on the base part 14 of the spring element 11, the operational amplifier OPA and a resistor network R1–R4, as is shown in FIG. 3. The diodes D1 and D2 limit the amplitude of the sensor vibration. By choosing the conducting-state voltage of these diodes, the amplitude can be determined. According to experience, self-excitation works better the higher the quality Q of the sensor. A value for Q of around 1000 represents a practical lower limit.

Piezoresistive sensors can likewise be operated in a self-excited manner. They are formed of a V-shaped spring element a few microns thick. On one side, they are strongly doped and therefore conductive. Piezoresistive spring elements change their resistance when they are bent. Current flow through the spring element causes heat loss and thus bending. In piezoresistive force springs, a feedback possibility arises via the resistance path of the spring element.

One wiring possibility for a piezoresistive sensor is shown in FIG. 4. To measure bending, the piezoresistive spring element VR is installed in a Wheatstone bridge with resistors R1, R2 and R3. The output signal of the bridge is amplified via an amplifier V. If this amplified output signal is capacitively supplied to the bridge feed voltage with a suitable phase shift via a phase shifter PS, the spring element can be caused to vibrate with its eigenfrequency. The voltage signal for controlling the vertical adjustment of the sensor, i.e., the input signal for the demodulator, is tapped at the output of the amplifier V.

When the bending is measured using a light pointer, a laser beam S1 from a laser L is pointed at a spring element F (FIG. 5). The reflected beam S2 is incident on a two-part detector D. When the spring element bends, the ratio of the light intensities incident on the detector changes. The difference signal is amplified and modulates the intensity of the laser beam with suitable phase shift via a modulator M. The transfer of momentum of the photons bends the spring element; in turn, this amplifies the detector signal.

Although it will generally be advantageous to use the same signal for self-excitation of the sensor vibration and for detection of the vibration frequency for distance control, it is not an essential feature of this invention. Thus, for example, for self-excitation of a piezoelectrical spring element, the voltage generated by the periodic deformation of the spring element can be used, while the light pointer process can be used to detect the vibration frequency.

Furthermore, the process for linearization of the control circuit and the self-excitation process can be used independently of one another, and can also advantageously be used with other sensors, for example, with conventional sensors, as are described initially in the evaluation of the prior art. Use of the sensor of the invention is not limited to the use with the process of tie invention. Still further, while the sensing tip has been described above as being a separate element, e.g., made of etched tungsten wire, that is attached to a spring element, e.g., made of quartz, it is also contemplated that the spring element and the sensing tip be made out of a single piece of e.g. quartz, instead two elements that have been bonded together.

Thus, while various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

I claim:

1. Device for noncontact scanning of a surface comprising a positioning unit and a sensor having a tuning fork, which has an upper spring tongue connected by a base part to a lower spring tongue and which is arranged with the spring tongues oriented essentially parallel to a surface to be scanned, and having a sensing tip on an underside of an end of the lower spring tongue; wherein the tuning fork has a quality equal or greater than approximately 1000 in air for vibration perpendicular to a longitudinal axis of the tuning fork and perpendicular to the surface to be scanned; and wherein the tuning fork is attached to the positioning unit at the upper spring tongue.

2. Device as claimed in claim 1, wherein the tuning fork is made of a piezoelectric material.

3. Device as claimed in claim 2, wherein the tuning fork is made of quartz.

4. Device as claimed in claim 1, wherein the tuning fork has a spring constant between 100 N/m and 100000 N/m.

5. Device as claimed in claim 1, wherein the tip is electrically isolated with respect to the spring element.

6. Device as claimed in claim 5, wherein the tip is made of etched tungsten wire.

7. Process for noncontact/intermittent contact scanning of a surface by means of a device with a sensor having an elongated spring element and a sensing tip attached thereto, comprising the steps of setting the sensor into a resonant vibration; acquiring at least one vibration parameter as a vibration signal; and controlling the distance between the surface to be scanned and the tip in response to changes of the vibration signal resulting from the action of a force between the sensing tip and the surface to be scanned; wherein said controlling step is performed using a distance control input signal which is derived from the changes of the vibration signal and which is more strongly linearly dependent on the distance between the sensing tip and the surface to be scanned than it is dependent on the vibration signal, the distance being based on at least one of a stored distance related value and a measured distance related value.

8. Process as claimed in claim 7, wherein the acquired vibration parameter is the vibration frequency.

9. Process as claimed in claim 7, wherein the controlling step is performed using a control circuit which is digital, and before the start of the control step, the dependency of the changes of the vibration signal on the distance between the tip and the surface to be scanned is measured and stored; and wherein the derived distance control input signal is formed from an inverse function of the measured and stored distance dependency.

10. Process as claimed in claim 7, wherein the controlling step is performed using a control circuit which is analog and the derived distance control signal is formed from a logarithm of the changes of the vibration signal.

11. Process as claimed in claim 10, wherein a logarithmic amplifier is used to amplify the changes of the vibration signal.

12. Process as claimed in claim 8, wherein the controlling step is performed using a control circuit which is analog and contains an intergrating component which produces a signal corresponding to changes of the vibration frequency represented by the vibration signal received at its input, and which is wired so as to produce an output signal which is equal to the inverse of the cube of the input, the output signal forming the derived distance control signal.

13. Process as claimed in claim 7, wherein a tuning fork, which has an upper spring tongue connected by a base part to a lower spring tongue and which is arranged with the spring tongues oriented essentially parallel to a surface to be scanned, is used as the elongated spring element, the sensing tip being attached to an underside of an end of the lower spring tongue; wherein the tuning fork has a quality equal or greater than approximately 1000 in air for vibration perpendicular to a longitudinal axis of the tuning fork and perpendicular to the surface to be scanned; and wherein the tuning fork is attached to a positioning unit at the upper spring tongue.

14. Process for noncontact scanning of a surface by means of a device with a sensor with an elongated spring element and a sensing tip attached thereto, comprising the step of setting the sensor into a resonant vibration and producing a signal from the resonant vibration of the spring element; and causing the signal to act in a positive feedback loop directly on the spring element to produce vibration of the sensor; wherein a tuning fork, which has an upper spring tongue connected by a base part to a lower spring tongue and which is arranged with the spring tongues oriented essentially parallel to a surface to be scanned, is used as the elongated spring element, the sensing tip being attached to an underside of an end of the lower spring tongue; and wherein the tuning fork has a quality equal or greater than approximately 1000 in air for vibration perpendicular to a longitudinal axis of the tuning fork and perpendicular to the surface to be scanned; and wherein the tuning fork is attached to a positioning unit at the upper spring tongue.

15. Process for noncontact scanning of a surface by means of a device with a sensor with an elongated spring element and a sensing tip attached thereto, comprising the step of setting the sensor into a resonant vibration and producing a signal from the resonant vibration of the spring element; and causing the signal to act in a positive feedback loop directly on the spring element to produce vibration of the sensor; wherein the distance between the sensing tip and the surface to be scanned is controlled by the steps of setting the sensor into a resonant vibration; acquiring at least one vibration parameter as a vibration signal; and controlling the distance between the surface to be scanned and the tip in response to changes of the vibration signal resulting from the action of a force between the sensing tip and the surface to be scanned; and wherein said controlling step is performed using a distance control input signal which is derived from the changes of the vibration signal and which is more strongly linearly dependent on the distance between the sensing tip and the surface to be scanned than it is dependent on the vibration signal, the distance being based on at least one of a stored distance related value and a measured distance related value.

* * * * *